US011274006B2

(12) United States Patent
Veis et al.

(10) Patent No.: US 11,274,006 B2
(45) Date of Patent: Mar. 15, 2022

(54) MEDIA SUPPORT

(71) Applicant: HP SCITEX LTD., Netanya (IL)

(72) Inventors: Alex Veis, Kadima (IL); Yuval Dim, Moshav Haniel (IL)

(73) Assignee: HP SCITEX LTD., Netanya (IL)

(*) Notice: Subject to any disclaimer, the term of this patent is extended or adjusted under 35 U.S.C. 154(b) by 838 days.

(21) Appl. No.: 15/918,959

(22) Filed: Mar. 12, 2018

(65) Prior Publication Data
US 2018/0305157 A1 Oct. 25, 2018

(30) Foreign Application Priority Data
Apr. 20, 2017 (EP) .................................. 17167310

(51) Int. Cl.
B65H 5/08 (2006.01)
B65H 11/00 (2006.01)
B65H 5/22 (2006.01)
B41J 11/00 (2006.01)
B65G 21/20 (2006.01)

(52) U.S. Cl.
CPC ........... B65H 11/005 (2013.01); B41J 11/007 (2013.01); B41J 11/0085 (2013.01); B65G 21/2036 (2013.01); B65H 5/224 (2013.01); B65H 2404/231 (2013.01); B65H 2404/264 (2013.01); B65H 2406/3221 (2013.01); B65H 2406/3223 (2013.01);
(Continued)

(58) Field of Classification Search
CPC ..... B41J 11/007; B41J 11/0085; B65H 5/085; B65H 5/224; B65H 5/10; B65H 11/005; B65H 2404/264; B65H 2406/312; B65H 2406/3124; B65H 2406/32; B65H 2406/321; B65H 2406/322; B65H 2406/3221; B65H 2406/3222; B65H 2406/3223; B65H 2406/32231; B65H 2406/344; B65H 2406/36; B65H 2406/361; B65H 2406/362; B65H 2406/363; B65H 2406/3622; B65H 2406/3632; B65G 15/58; B65G 21/2036
See application file for complete search history.

(56) References Cited

U.S. PATENT DOCUMENTS 1,957,621 A * 5/1934 Styron .................... B27L 5/002
144/242.1
3,628,654 A * 12/1971 Haracz .................. B65G 17/46
198/689.1
(Continued)

FOREIGN PATENT DOCUMENTS

CN 101058264 10/2007
CN 203567342 4/2014
(Continued)

OTHER PUBLICATIONS

Pikchain® Conveyor Chain for Intelligent Pick and Place Solutions, < http://www.igus.co.uk/wpck/7858/pikchain_blog?C=GB&L=en >.

Primary Examiner — Thomas A Morrison
(74) Attorney, Agent, or Firm — Steven R. Ormiston

(57) ABSTRACT

In one example, a media support includes a continuous loop belt and multiple suction cups arranged along the outer perimeter of the belt. Each suction cup has a port aligned with a hole in the belt so that air may be evacuated from the suction cup when connected to a vacuum source.

3 Claims, 13 Drawing Sheets

(52) U.S. Cl.
CPC .. *B65H 2406/361* (2013.01); *B65H 2406/363* (2013.01); *B65H 2701/1762* (2013.01)

(56) References Cited

U.S. PATENT DOCUMENTS

| | | | |
|---|---|---|---|
| 3,942,787 A | 3/1976 | Bolza-Schunemann et al. | |
| 4,180,258 A * | 12/1979 | Wildforster | B65G 57/035 271/196 |
| 4,381,596 A * | 5/1983 | Simonton | H01M 10/14 29/623.1 |
| 4,784,254 A * | 11/1988 | Schraft | B65B 23/12 198/434 |
| 5,687,641 A * | 11/1997 | Williamson | A21C 3/022 198/689.1 |
| 6,588,580 B2 * | 7/2003 | Janzen | B65G 15/58 198/689.1 |
| 8,220,919 B2 * | 7/2012 | DeGruchy | B41J 11/0085 347/104 |
| 8,353,591 B2 * | 1/2013 | Isowa | B41J 3/407 347/101 |
| 8,541,163 B2 * | 9/2013 | Yamaguchi | B65H 20/00 430/30 |
| 9,365,029 B2 | 6/2016 | Maul et al. | |
| 2010/0025918 A1 | 2/2010 | Miyazawa | |
| 2010/0259590 A1 | 10/2010 | DeGruchy | |
| 2010/0276868 A1 | 11/2010 | Moore et al. | |
| 2014/0240423 A1 | 8/2014 | Cressman et al. | |

FOREIGN PATENT DOCUMENTS

| | | | |
|---|---|---|---|
| CN | 204873000 | 12/2015 | |
| CN | 105705338 | 6/2016 | |
| CN | 105745081 | 7/2016 | |
| DE | 102014225507 | 6/2016 | |
| EP | 0773177 | 5/1997 | |
| EP | 1394079 | 3/2004 | |
| EP | 1847397 | 10/2007 | |
| ES | 2254563 T3 * | 6/2006 | ............ B65G 15/58 |
| GB | 2241683 * | 9/1991 | |
| GB | 2381241 | 4/2003 | |
| JP | 2003-137424 * | 5/2003 | |
| WO | WO-2007038928 | 4/2007 | |
| WO | WO-2016008597 | 1/2016 | |

* cited by examiner

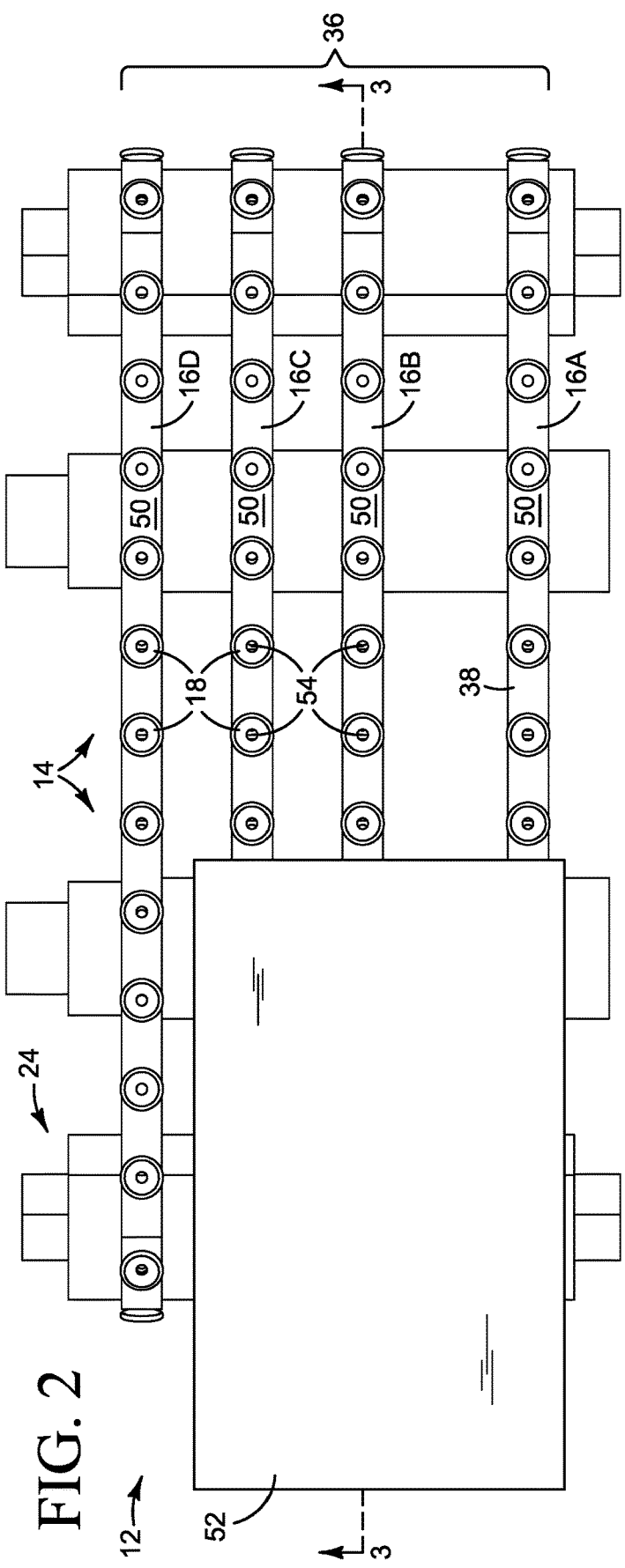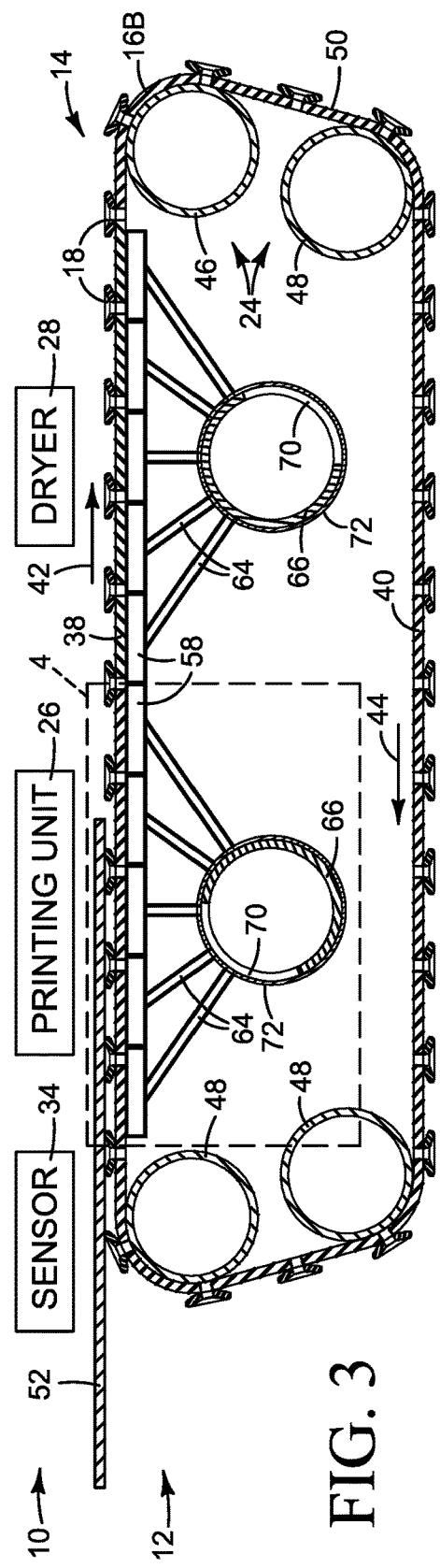

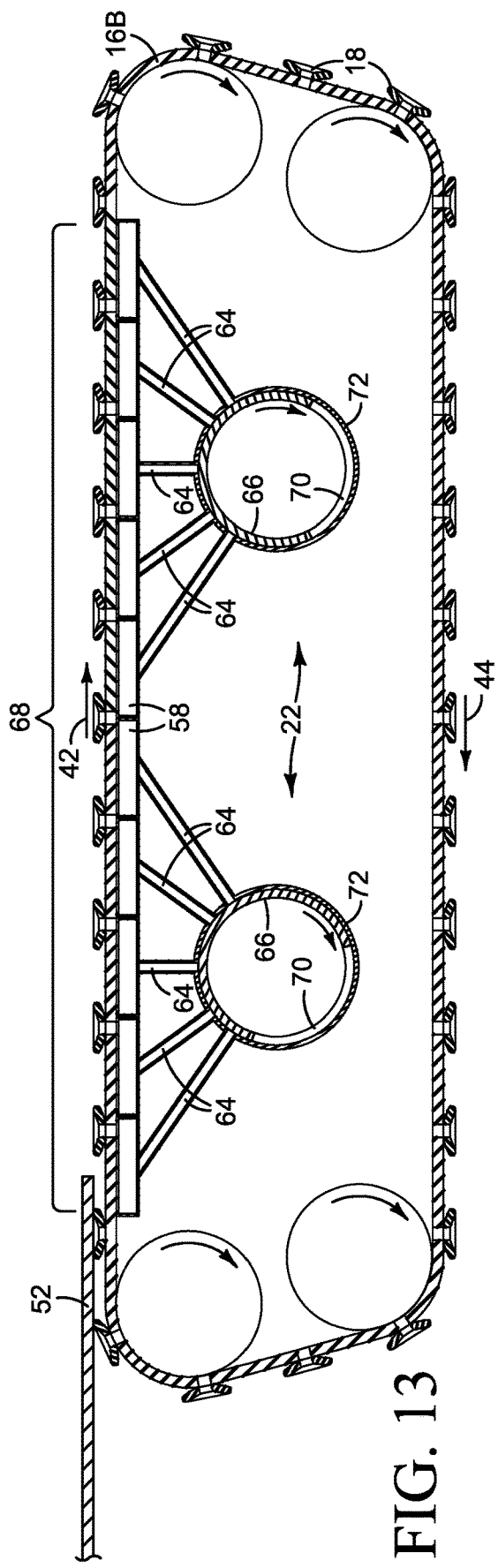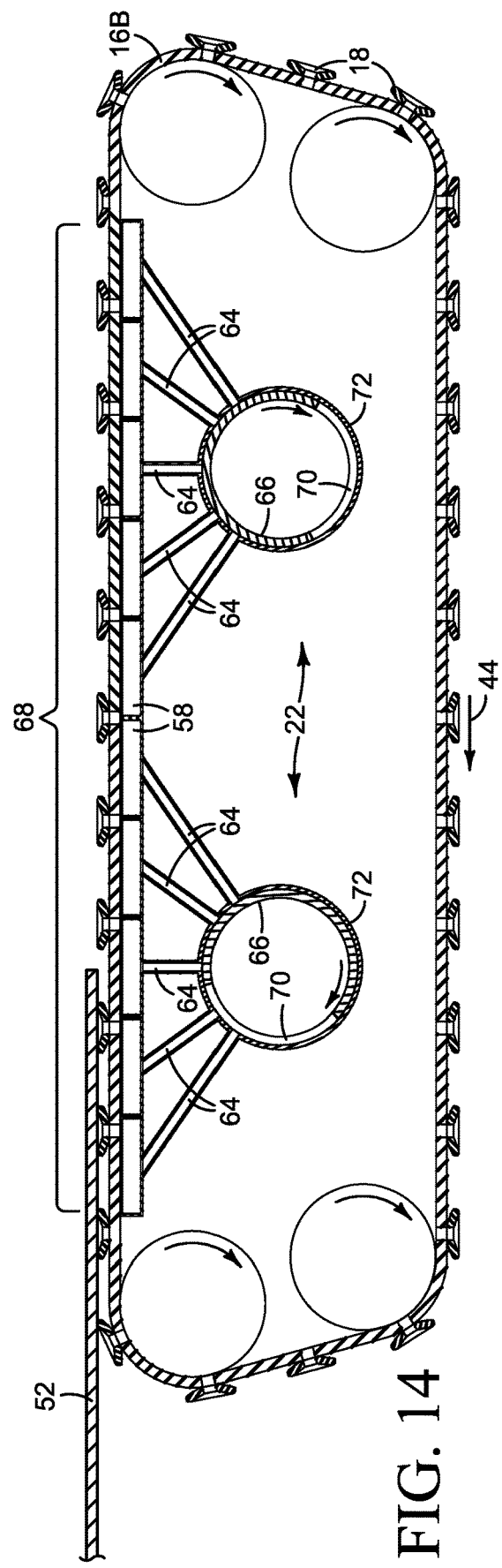

MEDIA SUPPORT

BACKGROUND

Large format inkjet printers use vacuum tables to hold down foamboard, cardboard and other inflexible or semi-flexible print media. High capacity vacuum pumps are used to develop the hold down forces needed to keep large sheets of such media flat during printing and drying.

DRAWINGS

FIGS. 2 and 3 are plan and elevation section views, respectively, illustrating an example implementation for a media support system shown in the block diagram of FIG. 1.

FIGS. 6-8 show alternate lateral positions for vacuum control.

FIGS. 13-16 are section details showing alternate rotational positions for vacuum control in the example media support system shown in FIGS. 2-8.

The same part numbers designate the same or similar parts throughout the figures. The figures are not necessarily to scale.

DESCRIPTION

Corrugated cardboard is widely used to make boxes. Although inkjet printers can print high quality images on corrugated cardboard, it is difficult to hold down corrugated cardboard flat during printing and drying to produce high quality inkjet images. Consequently, special, more expensive corrugated boards are sometimes used for inkjet printing. A new print media support has been developed to hold down regular, less expensive corrugated cardboard flat for inkjet printing. The support uses suction cups on a vacuum belt to help increase the hold down forces applied to corrugated cardboard and other print media compared to belts with vacuum holes alone. In one example, a vacuum control system supplies vacuum selectively to the suction cups that are covered by the print media as the suction cups circulate through the media hold down area, to reduce leakage and thus enable the use of smaller capacity vacuum pumps to generate the desired hold down forces.

These and other examples described below and shown in the figures illustrate but do not limit the scope of the patent, which is defined in the Claims following this Description.

As used in this document: "and/or" means one or more of the connected things; and a "processor readable medium" means any non-transitory tangible medium that can embody, contain, store, or maintain instructions and other information for use by a processor and may include, for example, circuits, integrated circuits, ASICs (application specific integrated circuits), hard drives, random access memory (RAM), read-only memory (ROM), and flash memory.

Figure 1:
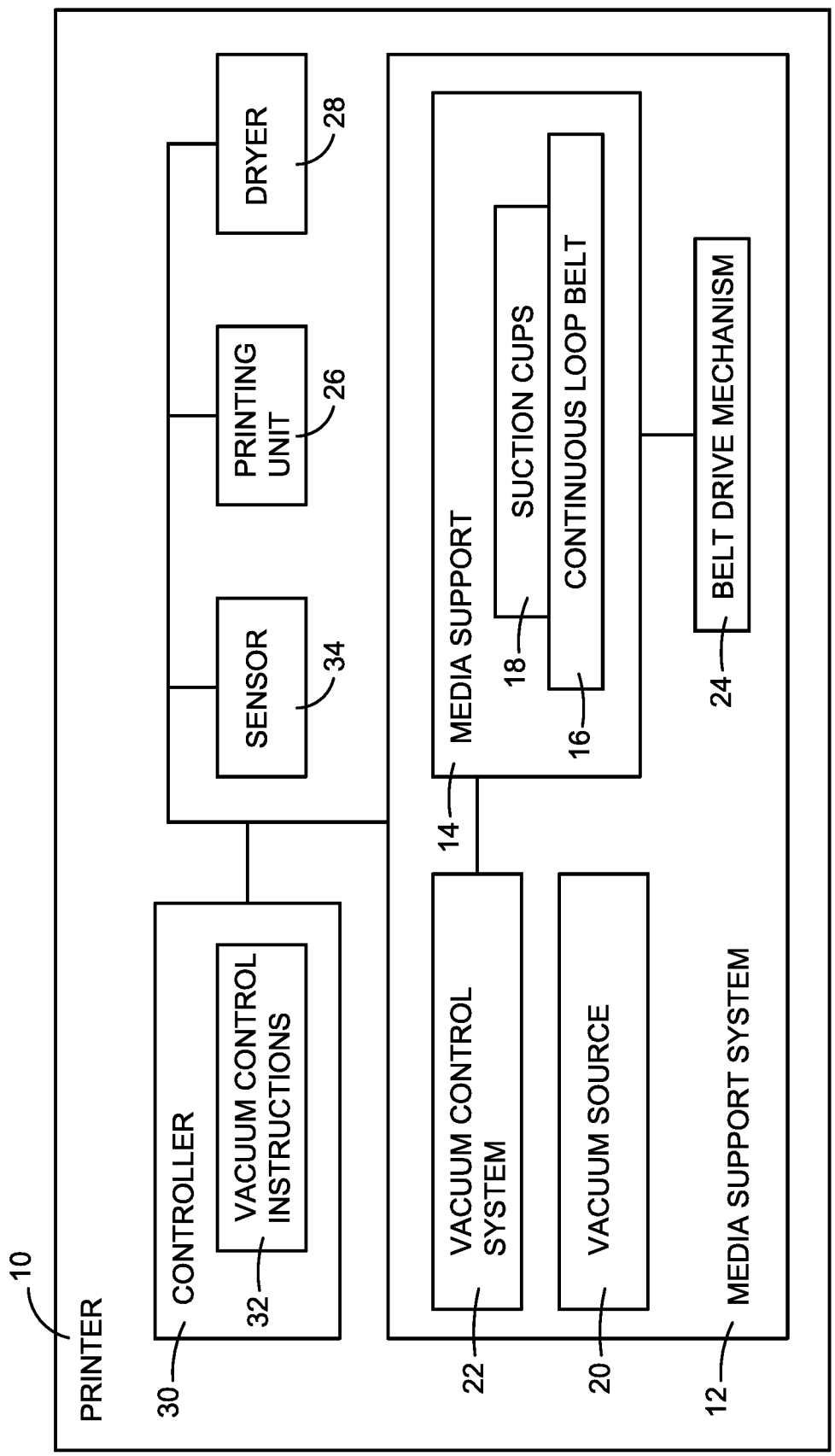
FIG. 1 is a block diagram illustrating an inkjet printer implementing one example of a new media support system.

FIG. 1 is a block diagram illustrating an inkjet printer 10 implementing one example of a new media support system 12. FIGS. 2 and 3 are plan and elevation section views, respectively, illustrating one implementation for a media support system 12 shown in the block diagram of FIG. 1. Referring to FIG. 1, printer 10 includes media support system 12 with a media support 14 that includes a continuous loop belt 16 and suction cups 18 on belt 16. System 12 also includes a vacuum pump or other suitable vacuum source 20, a vacuum control system 22 to control the supply of vacuum to suction cups 18, and a belt drive mechanism 24 to circulate belt 16. Printer 10 includes a printing unit 26 to print to a sheet of cardboard or other print media on support 14 and a dryer 28 to dry ink or other imaging material on printed media. Printing unit 26 may be implemented, for example, as an inkjet printhead assembly. Dryer 28 may be implemented, for example, as a hot air dryer.

Printer 10 includes a controller 30 operatively connected to media support system 12, printing unit 26, and dryer 28. Controller 30 represents the processing and memory resources and the instructions, electronic circuitry and components needed to control the operative elements of printer 10. In particular, controller 30 includes vacuum control instructions 32 to control the supply of vacuum to suction cups 18 through vacuum control system 22. Also, in this example, printer 10 includes a sensor 34 to sense print media on support 14. Controller 30 may use feedback from sensor 34 to help control the supply of vacuum to suction cups 18.

Any suitable drive mechanism 24 may be used to circulate belt 16. For example, drive mechanism 24 may include a drive roller to turn the belt and idler rollers to keep tension in the belt. A motor is operatively connected to the drive roller to turn the belt at the direction of printer controller 30, directly or through a separate motor controller.

Referring FIGS. 2 and 3, in this example belt 16 is configured as four individual belts 16A, 16B, 16C, 16D arranged parallel to one another laterally across a media support area 36, under printing unit 26 and dryer 28 in this example. Each belt 16A-16D circulates through an upper run 38, collectively defining support area 36, and a lower run 40. Arrows 42 indicate the direction each belt moves through upper run 38. Arrows 44 indicate the direction each belt moves through lower run 40. In this example, belt drive mechanism 24 (FIG. 1) includes a single drive roller 46 to turn all four belts 16A-16D simultaneously, and idler rollers 48 to keep tension in the belts.

Figure 4:
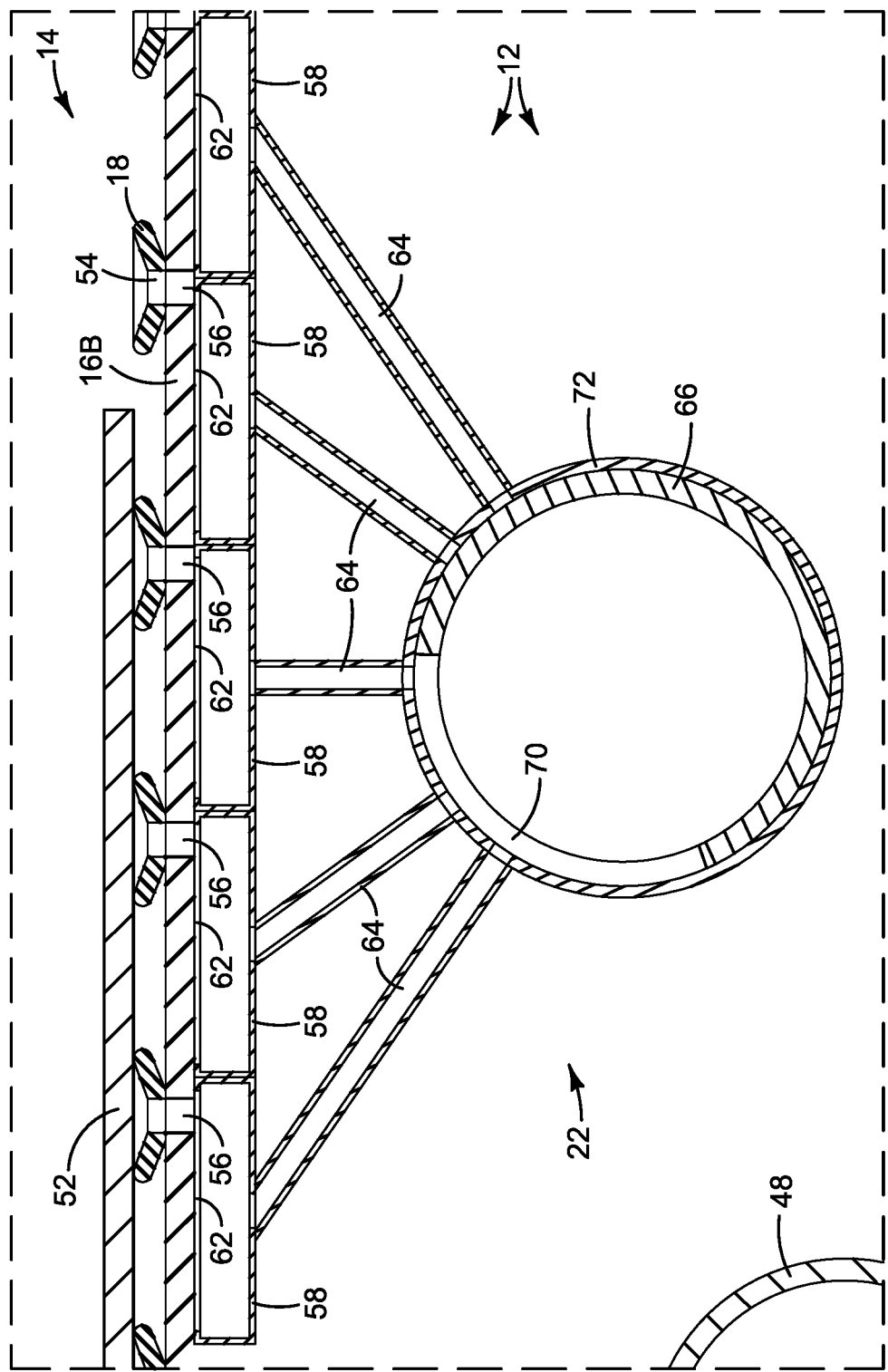
FIG. 4 is a detail from FIG. 3.

Suction cups 18 are arranged along the outer perimeter 50 of each belt 16A-16D so that multiple suction cups are exposed simultaneously along upper run 38 to hold down a media sheet 52 supported on the belts. Although sheet media is shown, examples are not limited to supporting sheet media, but may be used to support continuous web and other non-sheet media. In this example, media sheet 52 does not cover the full width of support area 36, defined by all four belts 16A-16B, and thus is supported on belts 16A, 16B, and 16C. As best seen in the detail of belt 16B shown in FIG. 4, each suction cup 18 includes a port 54 through which air may be evacuated from the suction cup. Each port 54 is aligned with a hole 56 in the belt to connect the corresponding port to the vacuum control system. In the example shown, each suction cup 18 is a discrete part affixed to the belt. In other examples, where suction cups 18 are integral to the belt, each port 54 will be coextensive with the corresponding hole 56.

Figure 7:
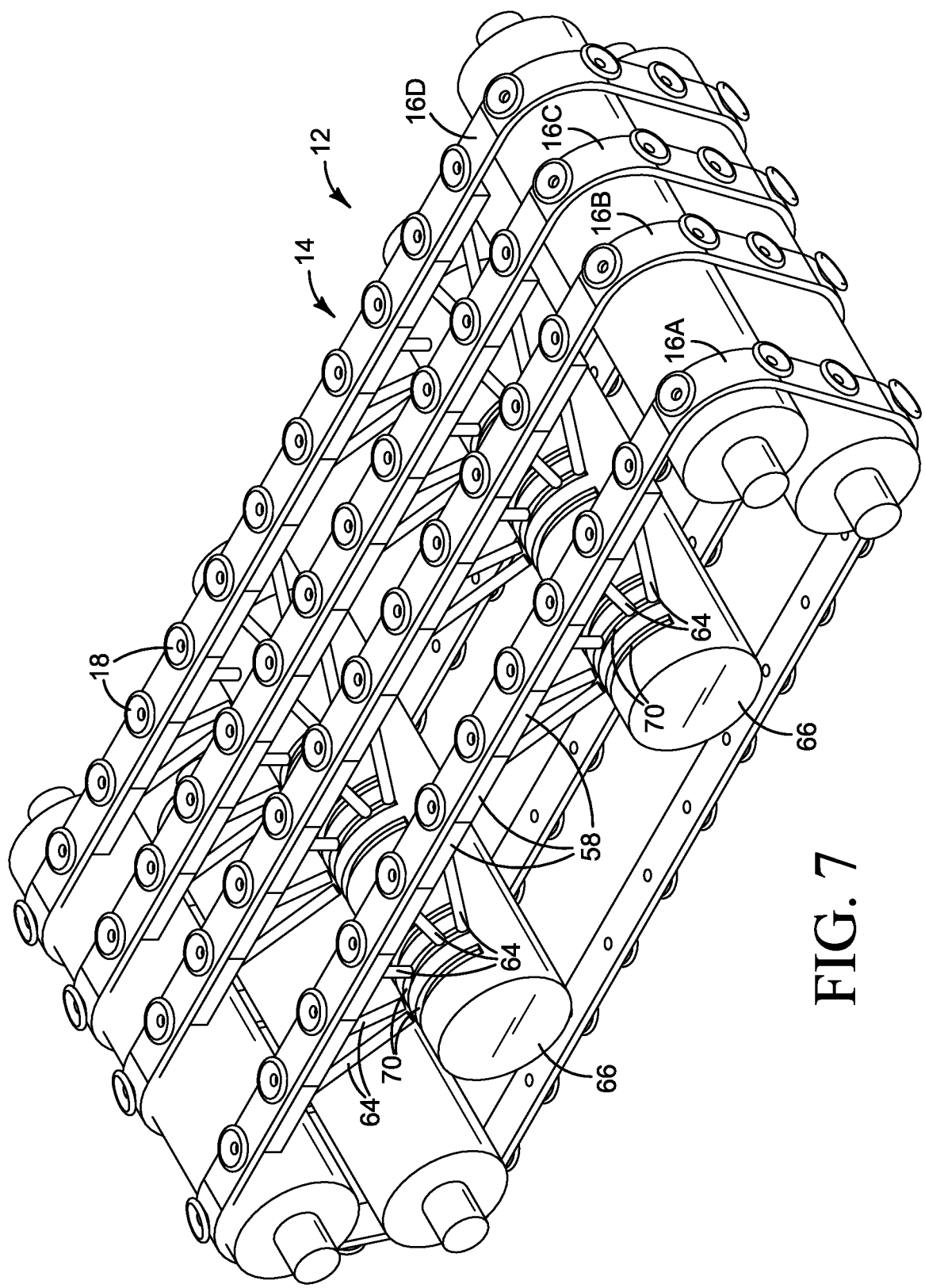
Figure 8:
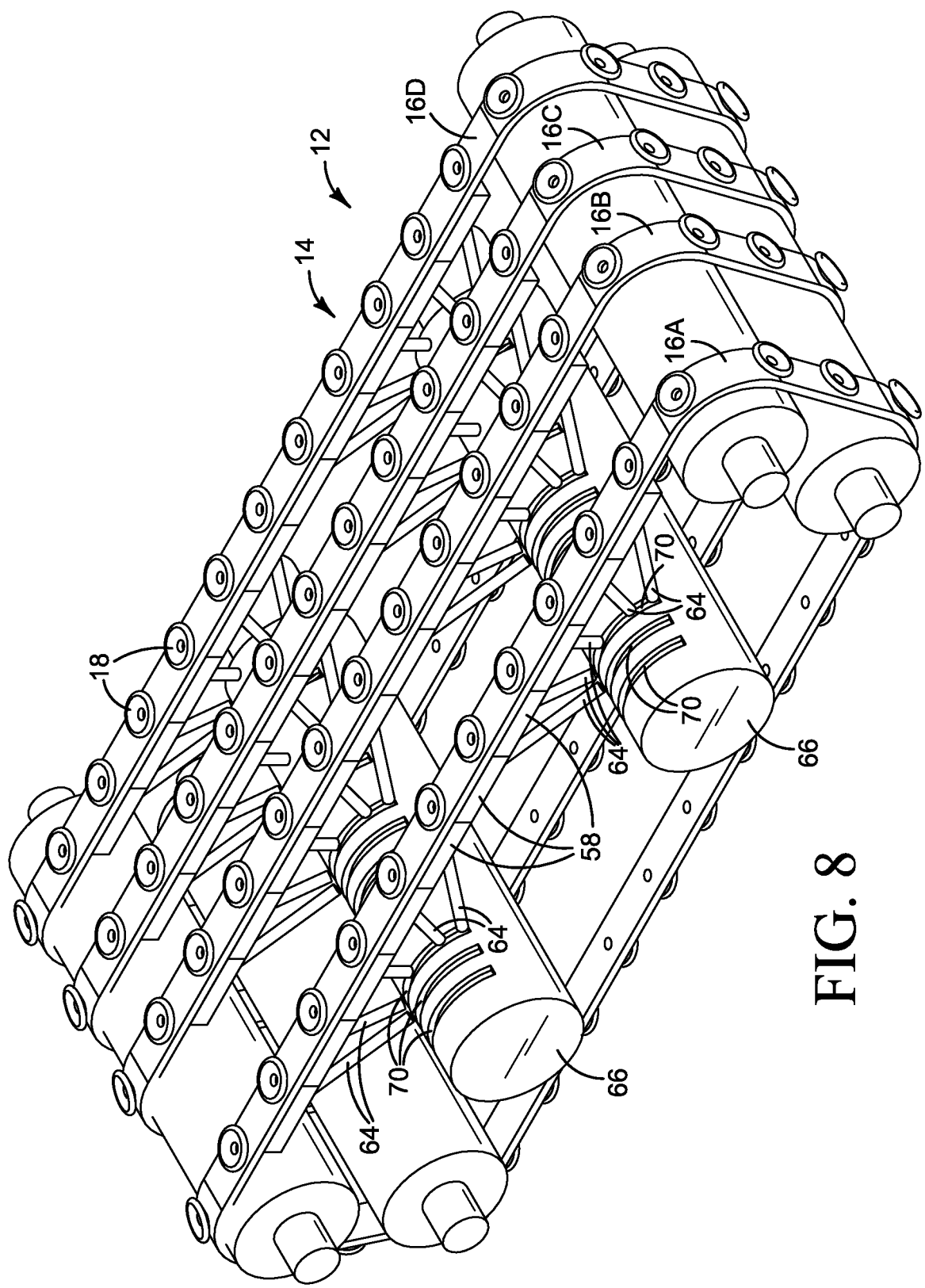
Figure 9:
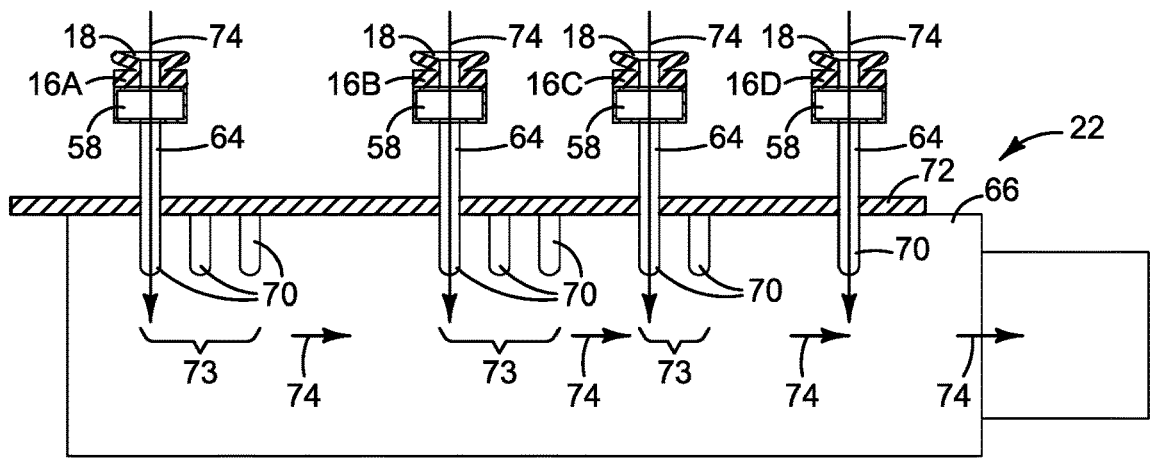
FIGS. 9-11 are front elevation details showing alternate lateral positions for vacuum control, corresponding to the example in FIGS. 6-8.
Figure 10:
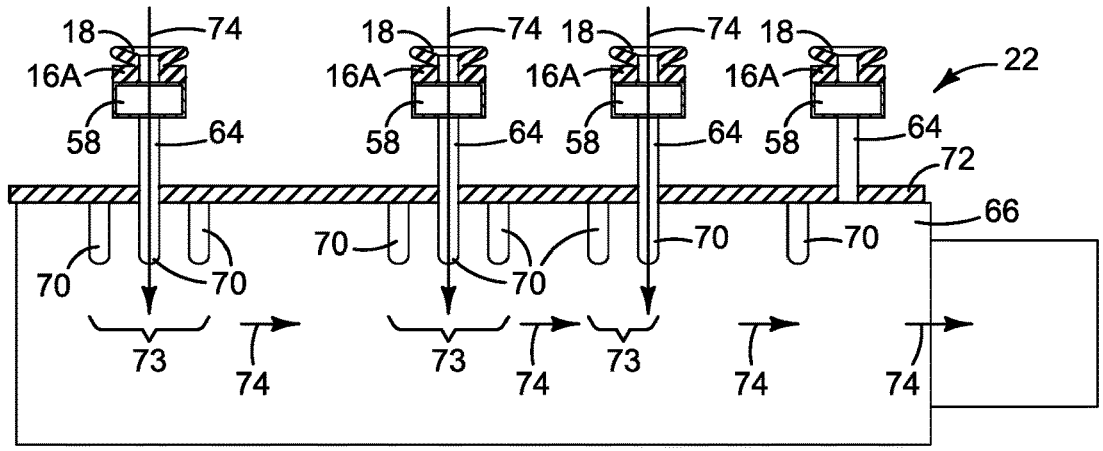
Figure 11:
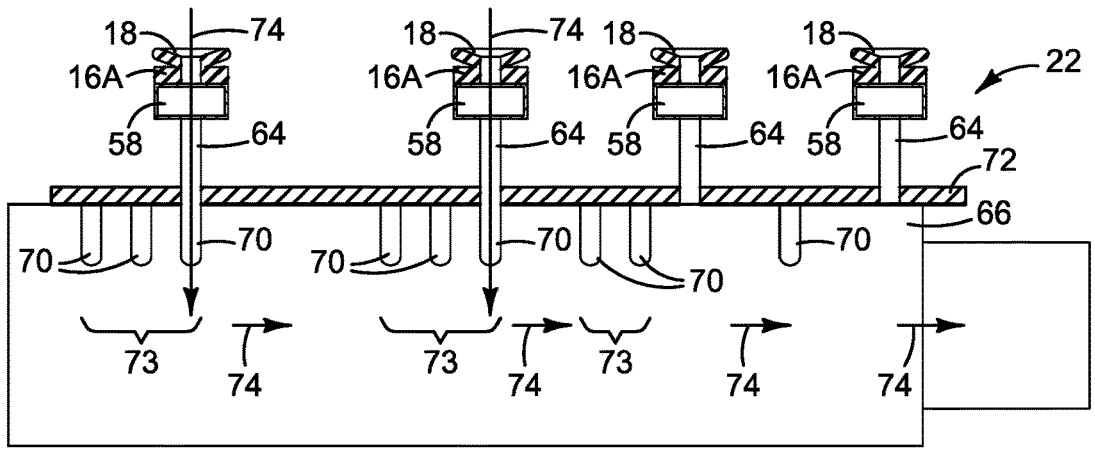
Figure 12:
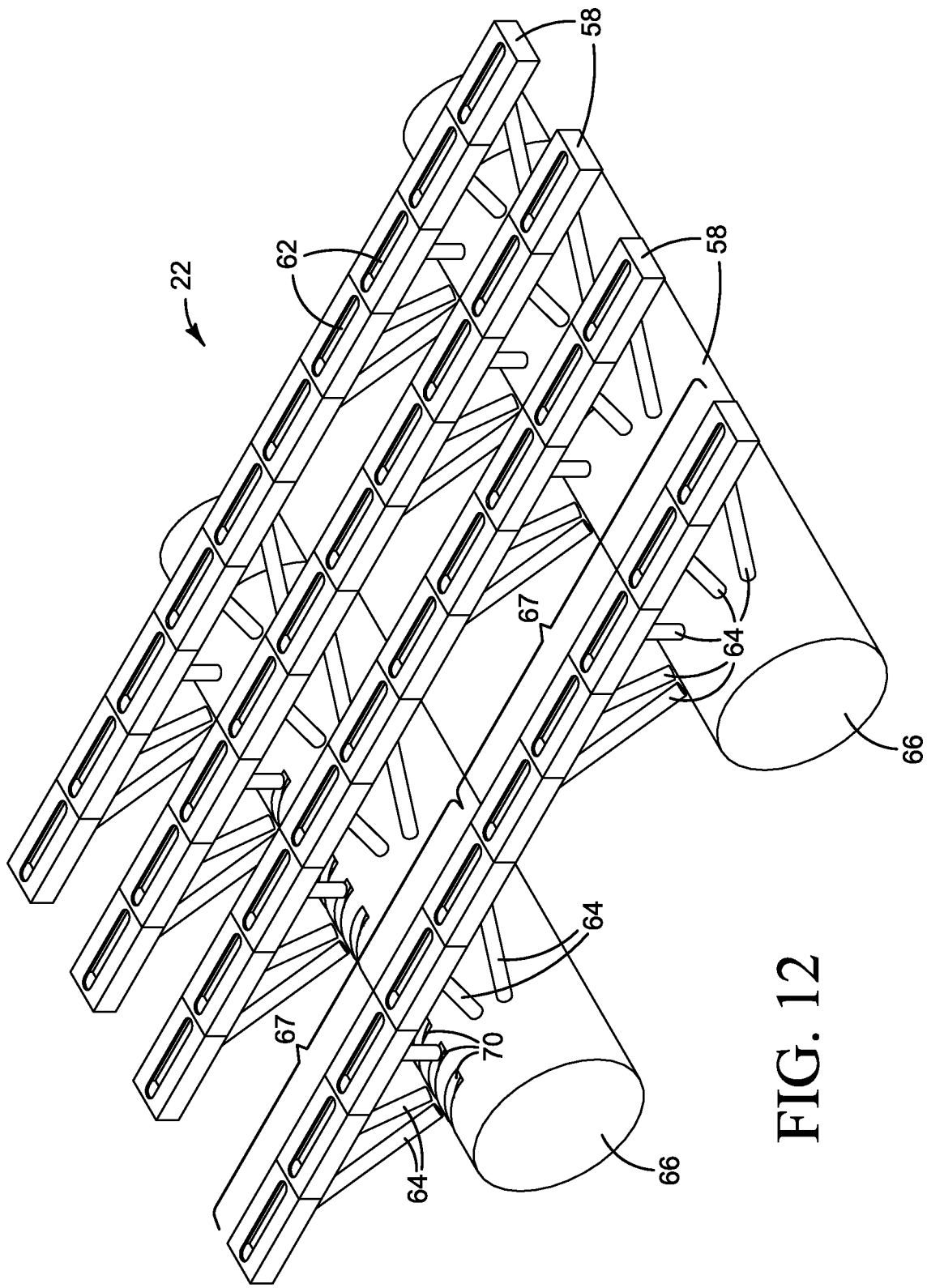
FIG. 12 is a perspective detail showing one example vacuum control system in the media support system shown in FIGS. 2-8.

FIGS. 5-16 illustrate media support system 12 in more detail. FIGS. 5 and 6-8 are front and rear perspectives of system 12, respectively. FIGS. 9-11 are front elevation details showing alternate lateral positions for vacuum control system 22 corresponding to FIGS. 6-8. FIG. 12 is a perspective detail of vacuum control system 22 and FIGS. 13-16 are section details showing alternate rotational positions for vacuum control system 22.

Figure 5:
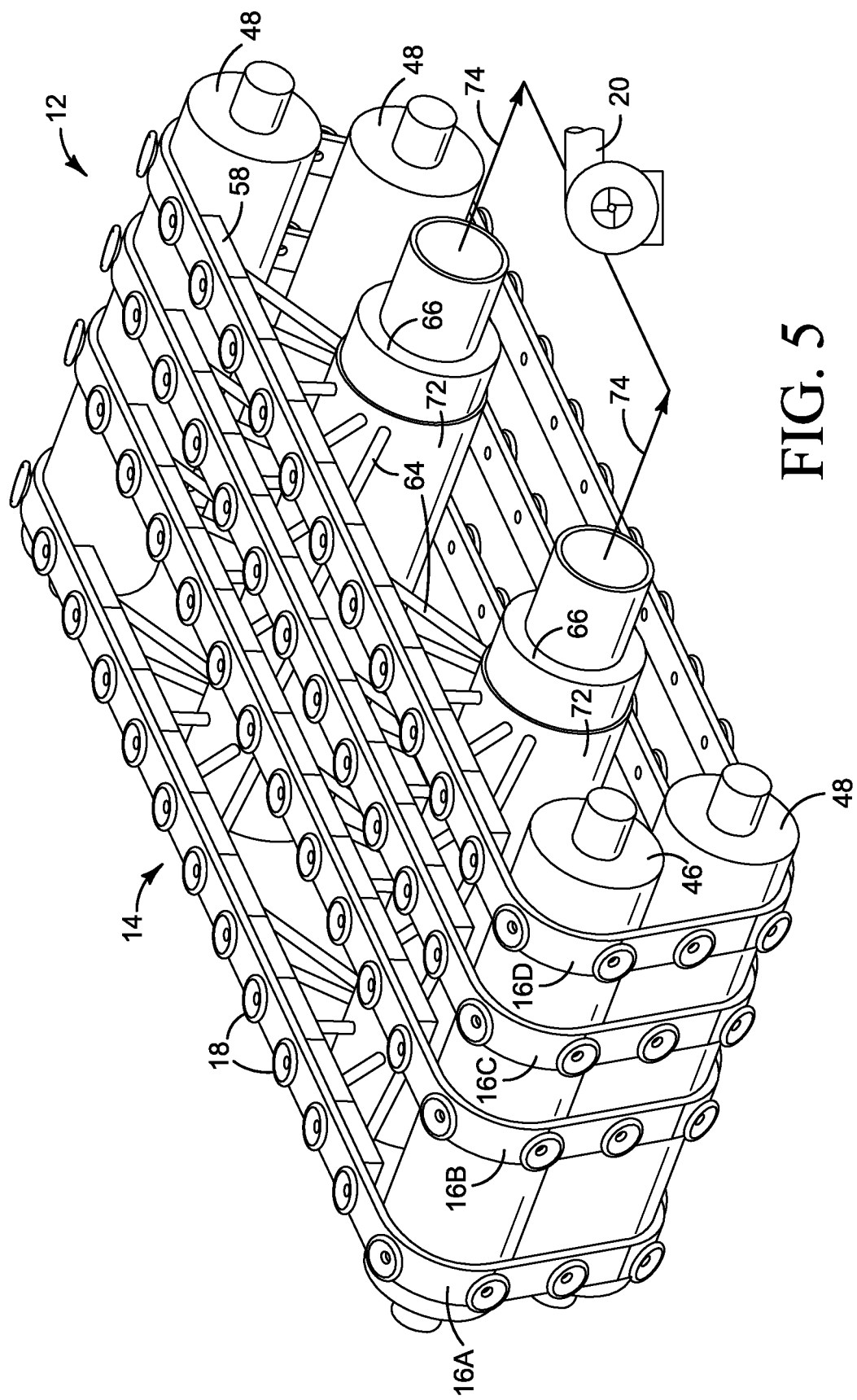
FIGS. 5 and 6-8 are front and rear perspectives, respectively, of the example media support system shown in FIGS. 2 and 3.

Referring now to FIGS. 2-16, vacuum control system 22 includes vacuum chambers 58 immediately adjacent to the inner perimeter 60 along the upper run 38 of each belt 16A-16D. A slot 62 (FIGS. 4 and 12) in each vacuum chamber 58 is aligned with holes 56 in each belt 16A-16D to allow air to be evacuated from each suction cup 18 through port 54 as the suction cup moves over a vacuum chamber 58. Vacuum control system 22 also includes conduits 64 that fan out from a central duct 66 to each chamber 58. In the example shown in the figures, two ducts 66 supply vacuum to corresponding groups 67 (FIG. 12) of chambers 58 through conduits 64 along each belt 16A-16D to define a media hold down area 68 (FIG. 13) within media support area 36. Each duct 66 is attached to a vacuum source 20 (FIG. 5). Circumferential slots 70 in each duct 66 connect conduits 64 to vacuum source 20.

As best seen in the sequence of FIGS. 13-16, each duct 66 is rotatable to open and close individual conduits 64 to control the supply of vacuum to suction cups 18 along each belt. Also, as best seen in the sequence of FIGS. 6-8 and 9-11, each duct 66 is translatable to simultaneously open and close all of the conduits 64 for one or more belts 16A-16D. A seal 72 around each duct 66 inhibits vacuum leaks along each circumferential slot 70. Seals 72 are omitted from FIGS. 6-8 and 12 to more clearly show other features of vacuum control system 22.

Figure 6:
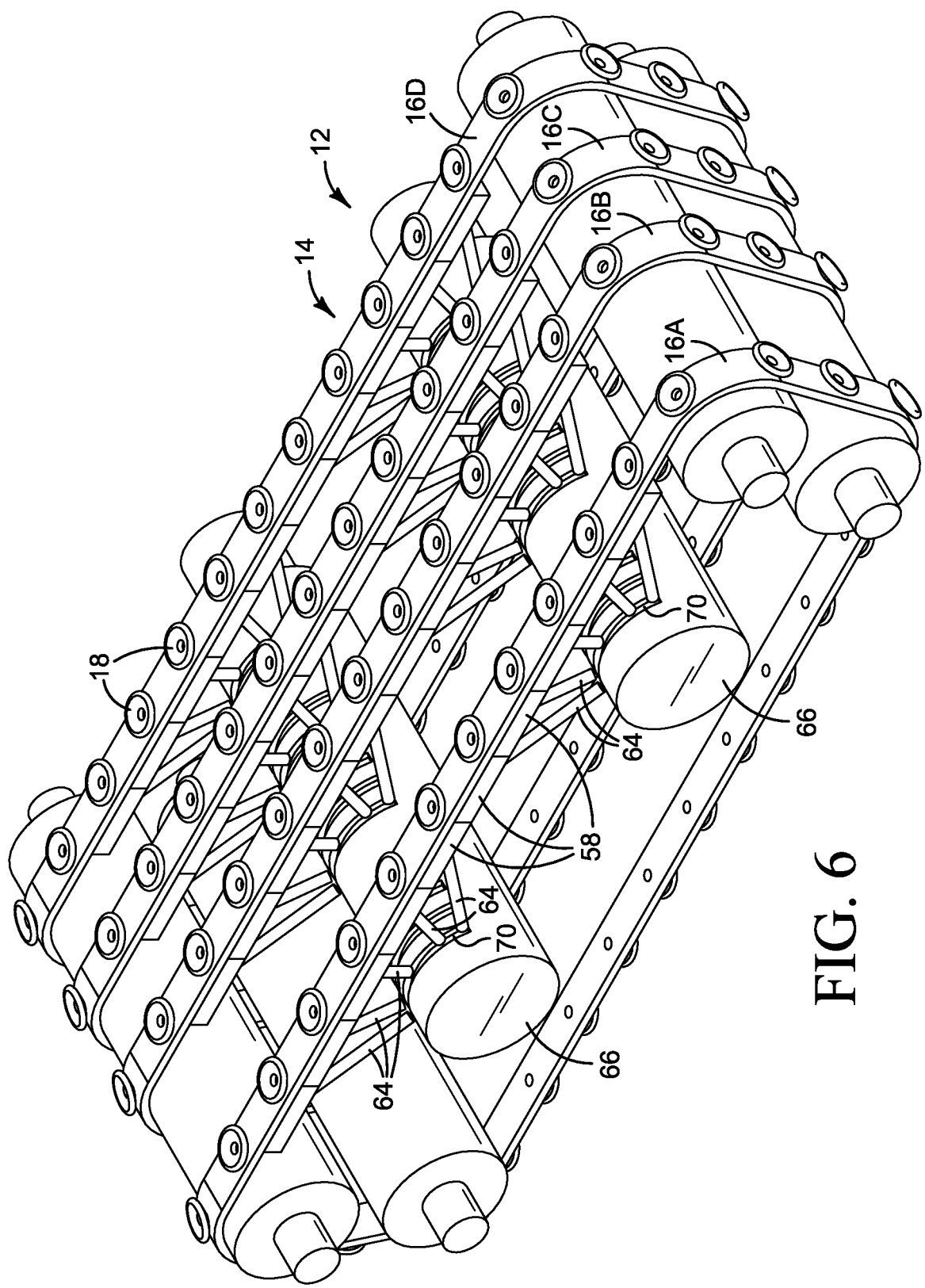

Control system 22 is configured to control the supply of vacuum collectively to the suction cups among belts 16A-16D. FIGS. 6-8 and 9-11 illustrate one example for controlling the supply of vacuum collectively to the suction cups among the belts. In this example, each central duct 66 includes a group 73 of three slots 70 for belts 16A and 16B, a group 73 of two slots 70 for belt 16C, and a single slot 70 for belt 16D. In FIGS. 6 and 9, ducts 66 are positioned translationally (laterally across the hold down area) so that a circumferential slot 70 in each duct 66 is aligned laterally with the conduits 64 to every belt 16A-16D, to supply vacuum to the suction cups on all four belts 16A-16D (when individual conduits are open), as indicated by flow arrows 74 in FIG. 9. In FIGS. 7 and 10, ducts 66 are positioned translationally so that a slot 70 is aligned laterally to belts 16A, 16B and 16C, but not belt 16D, to supply vacuum to the suction cups on three of the four belts (when individual conduits are open), as indicated by flow arrows 74 in FIG. 10. In FIGS. 8 and 11, ducts 66 are positioned translationally so that a slot 70 is aligned laterally to belts 16A and 16B, but not belts 16C and 16D, to supply vacuum to the suction cups on two of the four belts (when individual conduits are open), as indicated by flow arrows 74 in FIG. 11.

Thus, each duct 66 functions as a valve to simultaneously open and close all of the conduits in a group of conduits fanning out from the duct to one of the belts. In one example, the width of media 52 is preset and ducts 66 are moved to the corresponding translational position before printing begins. In another example, a sensor 34 senses the size of media 52 entering the media support area to signal controller 30 (FIG. 1) to move ducts 66, through control system 22, to the corresponding translational position "on the fly" during a printing operation.

Figure 15:
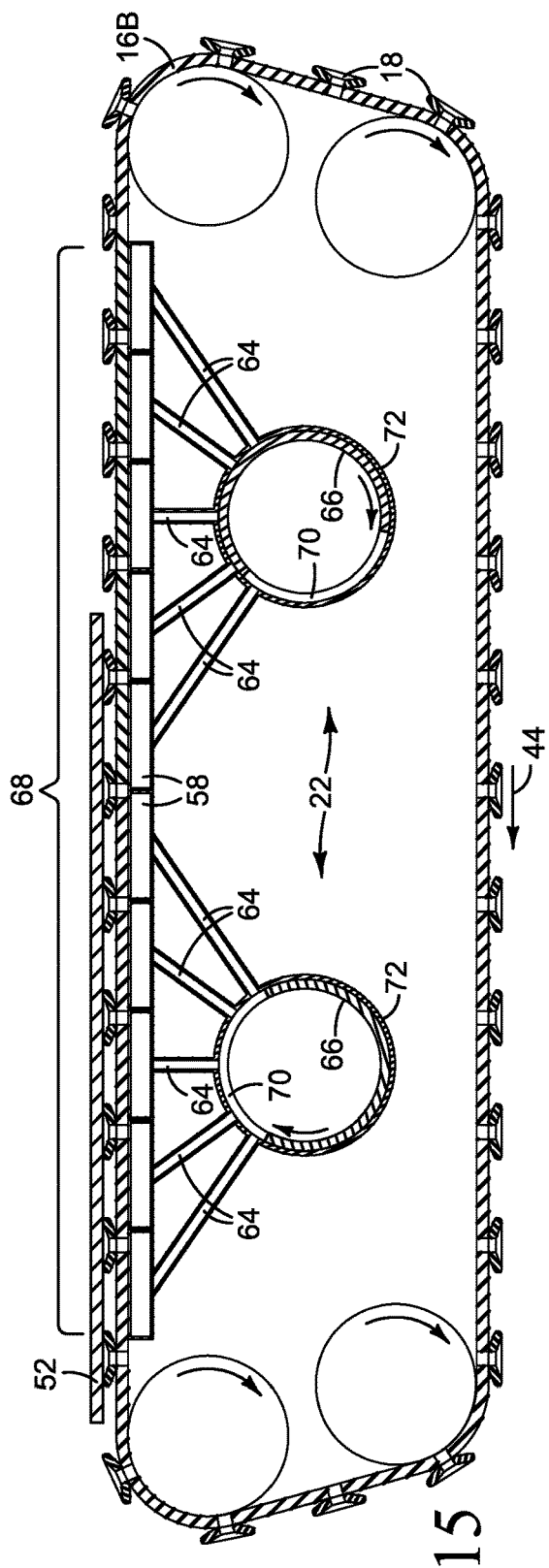
Figure 16:
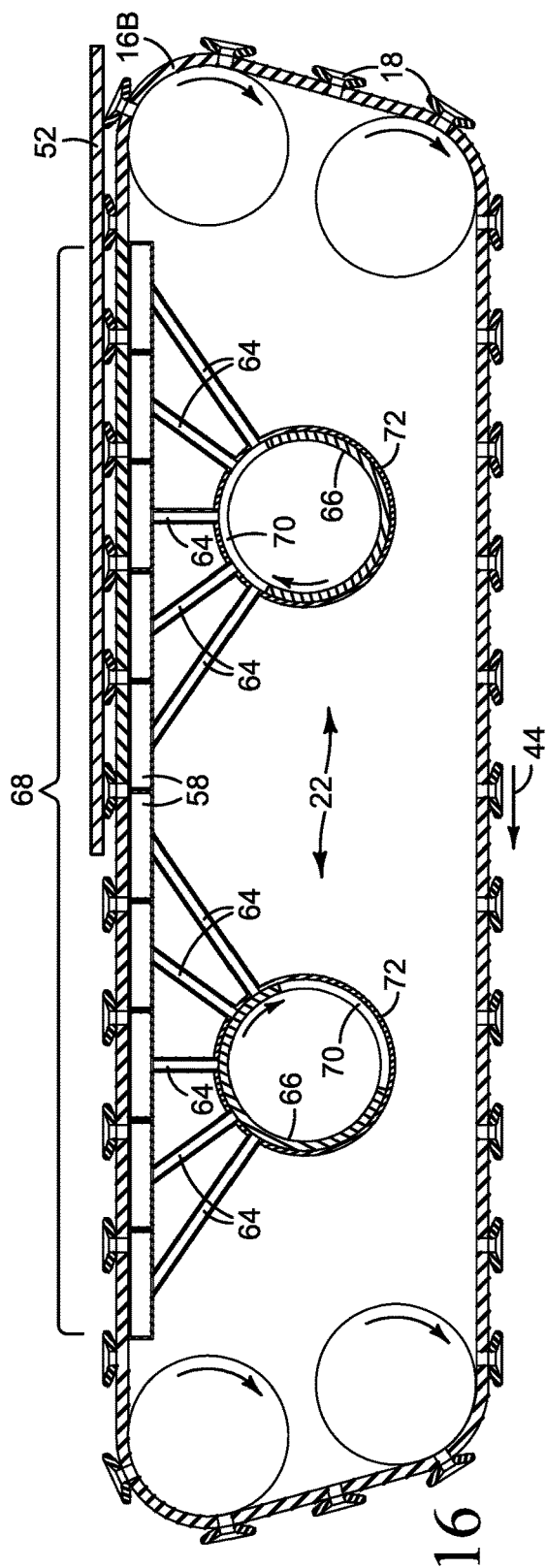

In this example, control system 22 is also configured to control the supply of vacuum individually to the suction cups on each belt 16A-16D. FIGS. 13-16 illustrate one example for controlling the supply of vacuum individually to the suction cups on each belt. In FIG. 13, the leading edge of media sheet 52 has reached sensor 34 (FIG. 3) to signal controller 30 (FIG. 1) to supply vacuum to media hold down area 68 through control system 22. In FIGS. 14-16, ducts 66 are rotating in sync with the leading edge of media sheet 52 moving through media hold down area 68 to open each conduit 64 in sequence, to supply vacuum to chambers 58 and the corresponding suction cups 18 in hold down area 68, and then close each conduit 64 in sequence as the trailing edge of sheet 52 passes by.

Each duct 66 functions as a valve to open and close each of the conduits individually in sync with the passing media so that a leading suction cup is connected to the vacuum source and then a trailing suction cup is connected to the vacuum source while the leading suction cup is still connected to the vacuum source. When the leading suction cup reaches the end of the hold down area, it is disconnected from the vacuum source while the second, trailing suction cup is still connected to the vacuum source. Then, when the second, trailing suction cup reaches the end of the hold down area, it too is disconnected from the vacuum source. The sequence continues with leading and trailing suction cups until the media sheet is moved all the way through the hold down area.

Vacuum chambers 58, conduits 64 and the rotatable and translatable vacuum ducts 66 together function as a manifold to simultaneously distribute vacuum collectively to multiple groups of suction cups across the width of multiple suction cup belts and individually to suction cups along the length of each of the belt, as described above with reference to FIGS. 6-16.

Figure 17:
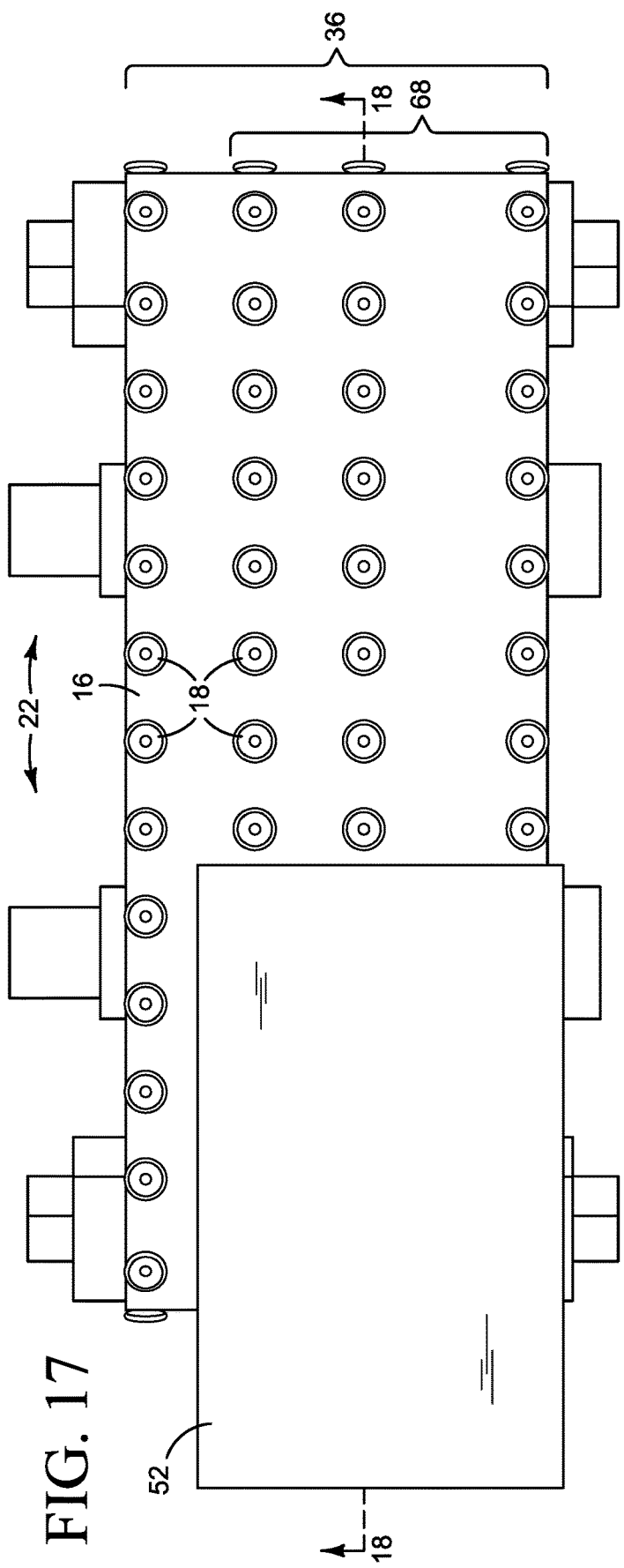
FIGS. 17 and 18 are plan and elevation section views, respectively, illustrating another example implementation for a media support system shown in the block diagram of FIG. 1.
Figure 18:
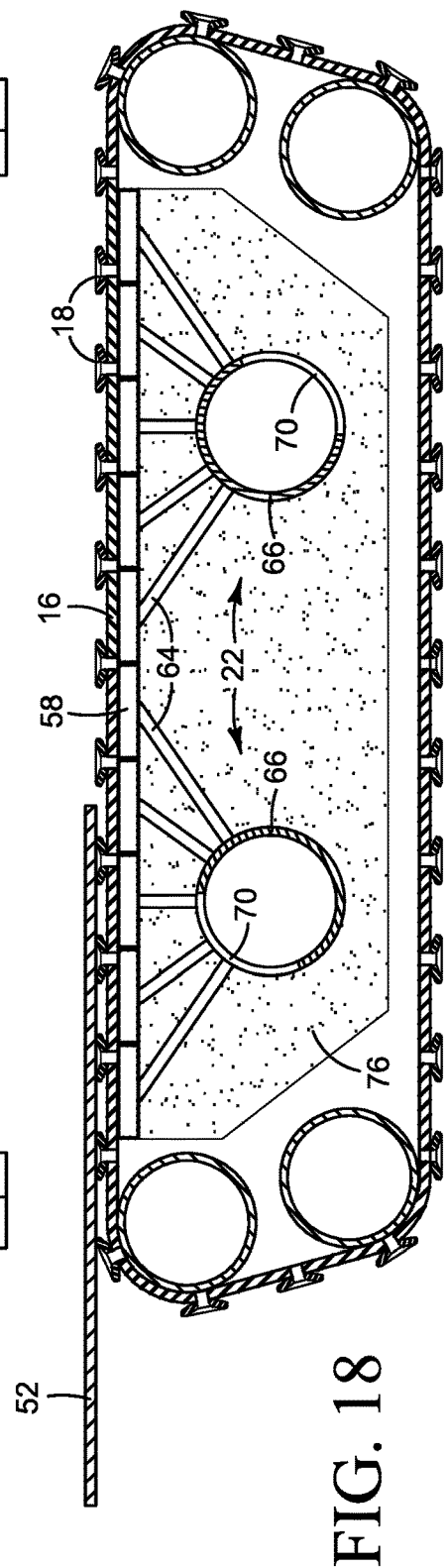

In another example, shown in FIGS. 17 and 18, the suction cup belt is implemented as a single belt 16 with multiple rows of suction cups 18. Also in this example, conduits 64 and ducts 66 are embedded in a support structure 76 that also functions as a seal to inhibit vacuum leaks along circumferential slots 70. For a single belt implementation such as that shown in FIGS. 17 and 18, vacuum chambers 58, conduits 64 and the rotatable and translatable vacuum ducts 66 together function as a manifold to simultaneously distribute vacuum collectively to multiple groups of suction cups across the width of the belt and individually to suction cups along the length of the belt.

In the examples shown, belt holes 56 and suction cups 18 are arranged uniformly around each belt in a straight line. Other suitable lengthwise arrangements are possible. For example, it may be desirable in some applications to vary the spacing between suction cups around each belt and/or to stagger the suction cups on each side of a center line around each belt. Also in the examples shown, the spacing between the parallel lines of suction cups is not uniform. Referring to the plan views in FIGS. 2 and 17, media sheet 52 is registered to the bottom of the media support area (the right side in the direction the sheet moves through the media support area). The spacing between lines of suction cups may be greater near the registration reference where even the narrowest sheet will cover the suction cups, as shown, and lesser away from the registration reference to more easily accommodate sheets of increasing width.

The configurations for a vacuum control system 22 shown in the figures are just examples. Other suitable configurations are possible. For example, more or fewer vacuum chambers 58, conduits 64, and/or ducts 66 may be used to vary the size of the media hold down area and/or the concentration of vacuum chambers within the hold down area. For another example, other valve mechanisms may be used to open and close the supply of vacuum to the suction cups.

Figure 19:
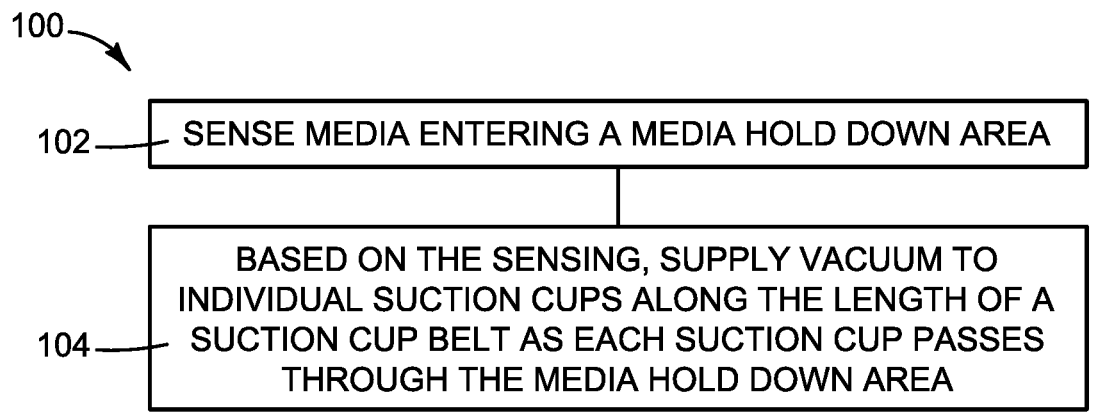
FIGS. 19 and 20 are flow diagrams illustrating example vacuum control processes, such as might be implemented in the media support system shown in FIGS. 2-4.

FIG. 19 is a flow diagram illustrating one example of a vacuum control process 100, such as might be implemented with a vacuum control system 22 shown in FIGS. 2-18. Referring to FIG. 19, media entering a media hold down area is sensed (block 102) and, based on the sensing, vacuum is supplied to individual suction cups along the length of a suction cup belt as each suction cup passes through the media hold down area (block 104). In one example, the supply of vacuum to each suction cup is initiated when the suction cup enters the hold down area and ends when each suction cup leaves the hold down area.

Figure 20:
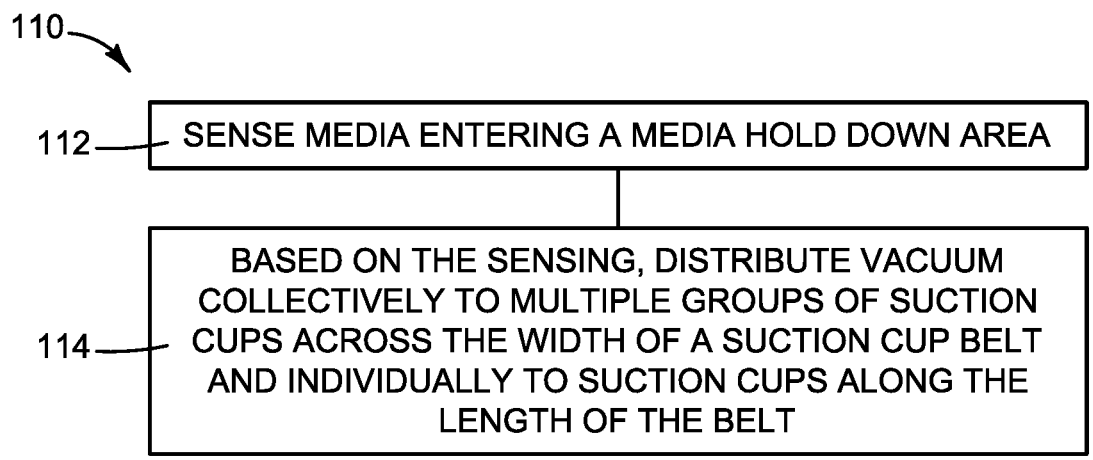

FIG. 20 is a flow chart illustrating another example of a vacuum control process 110, such as might be implemented with a vacuum control system 22 shown in FIGS. 2-16. Referring to FIG. 20, media entering a media hold down area is sensed (block 112) and, based on the sensing, vacuum is simultaneously distributed collectively to multiple groups of suction cups across the width of one or multiple suction cup belts and individually to suction cups along the length of the belt(s) (block 114). In one example, vacuum is distributed collectively to multiple groups of suction cups across the width of the belt(s) in block 114 based on the width of the media entering the hold down area.

Figure 21:
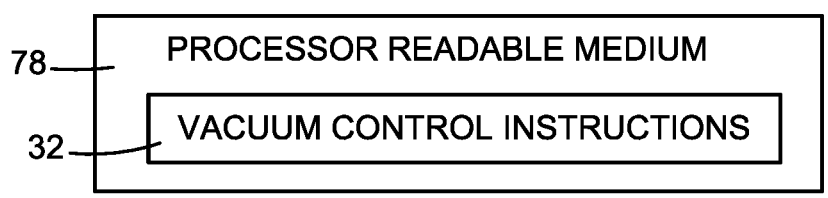
FIG. 21 is block diagram illustrating one example of a processor readable medium with vacuum control instructions, such as might be executed with a printer controller shown in FIG. 1.

FIG. 21 is a block diagram illustrating one example of a processor readable medium 78 with vacuum control instructions 32, such as might be executed with a printer controller 30 in FIG. 1. Vacuum control instructions 32 may include, for example, instructions to perform process 100 shown in FIG. 19. Vacuum control instructions 32 may include, for another example, instructions to perform process 110 shown in FIG. 20.

The examples shown in the figures and described above illustrate but do not limit the patent, which is defined in the following Claims.

"A", "an" and the used in the claims means one or more. For example, "a continuous loop belt" means one or more continuous loop belts and subsequent reference to "the belt" means the one or more belts.

The invention claimed is:

1. A media support system, comprising:
a continuous loop belt having an inner perimeter, an outer perimeter, and multiple holes each extending through the belt from the inner perimeter to the outer perimeter;
a drive mechanism to circulate the belt in a first direction along an upper run to support a media sheet and in a second direction opposite the first direction along a lower run;
multiple suction cups arranged along the outer perimeter of the belt so that multiple suction cups are exposed simultaneously along a length of the upper run of the belt to hold down media sheets supported on the upper run of the belt, each suction cup having a port aligned with one of the holes through which air may be evacuated from the suction cup; and
a vacuum control system to connect each suction cup port along the upper run of the belt to a vacuum source, the vacuum control system comprising:
multiple rows of multiple enclosures, each enclosure defining a vacuum chamber to underlay the upper run of the belt;
a linear slot along a top of each enclosure to align with holes in the belt;
a tubular duct;
circumferential slots in the duct arranged to include at least one group of multiple slots and at least one single slot; and
multiple conduits each extending between the duct and one of the enclosures; and where the duct is:
translatable to align some or all of the conduits to a circumferential slot according to the translational position of the duct; and
rotatable to connect some or all of the aligned conduits to a circumferential slot according to the rotational position of the duct.

2. The system of claim 1, comprising the vacuum source connected to the duct.

3. The system of claim 1, comprising a sleeve around the duct to cover the circumferential slots when not aligned with a conduit.

* * * * *